June 24, 1924.
C. L. HARRIS
INSECT DESTROYER
Filed May 16, 1923
1,498,793
2 Sheets-Sheet 1
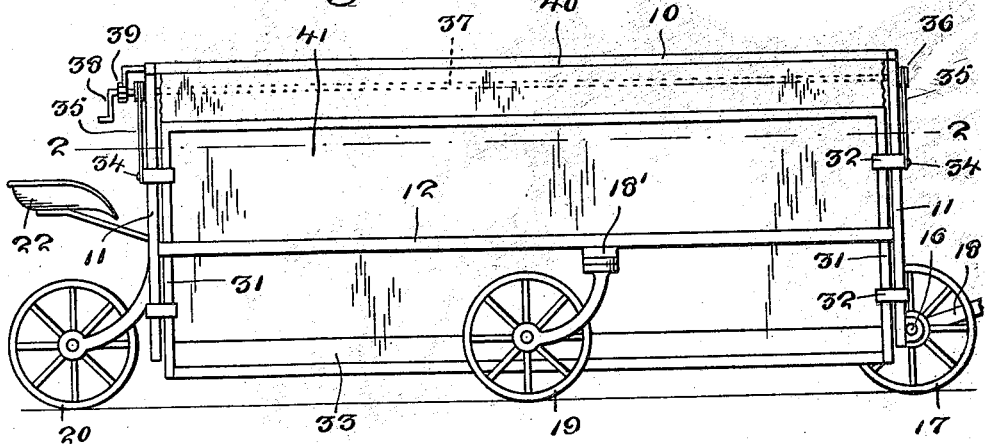
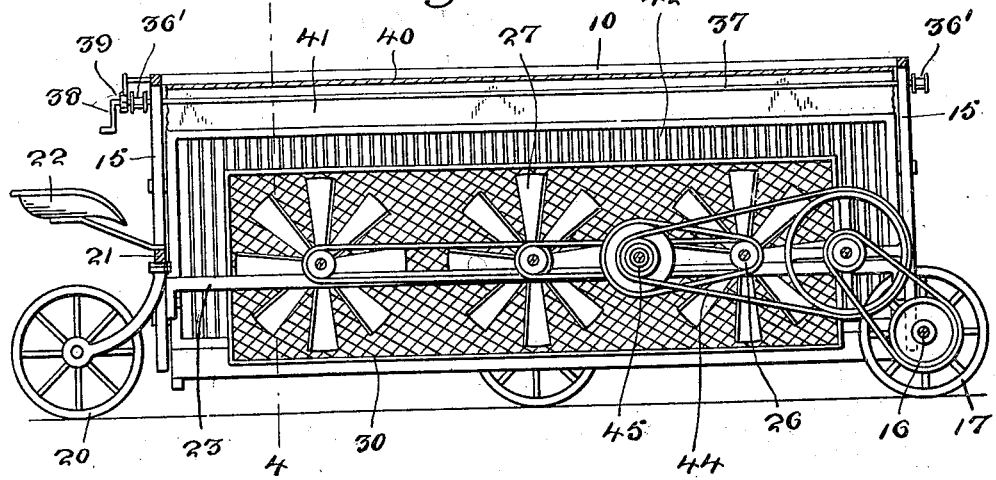
C. L. Harris
INVENTOR
BY Victor J. Evans
ATTORNEY
WITNESS:

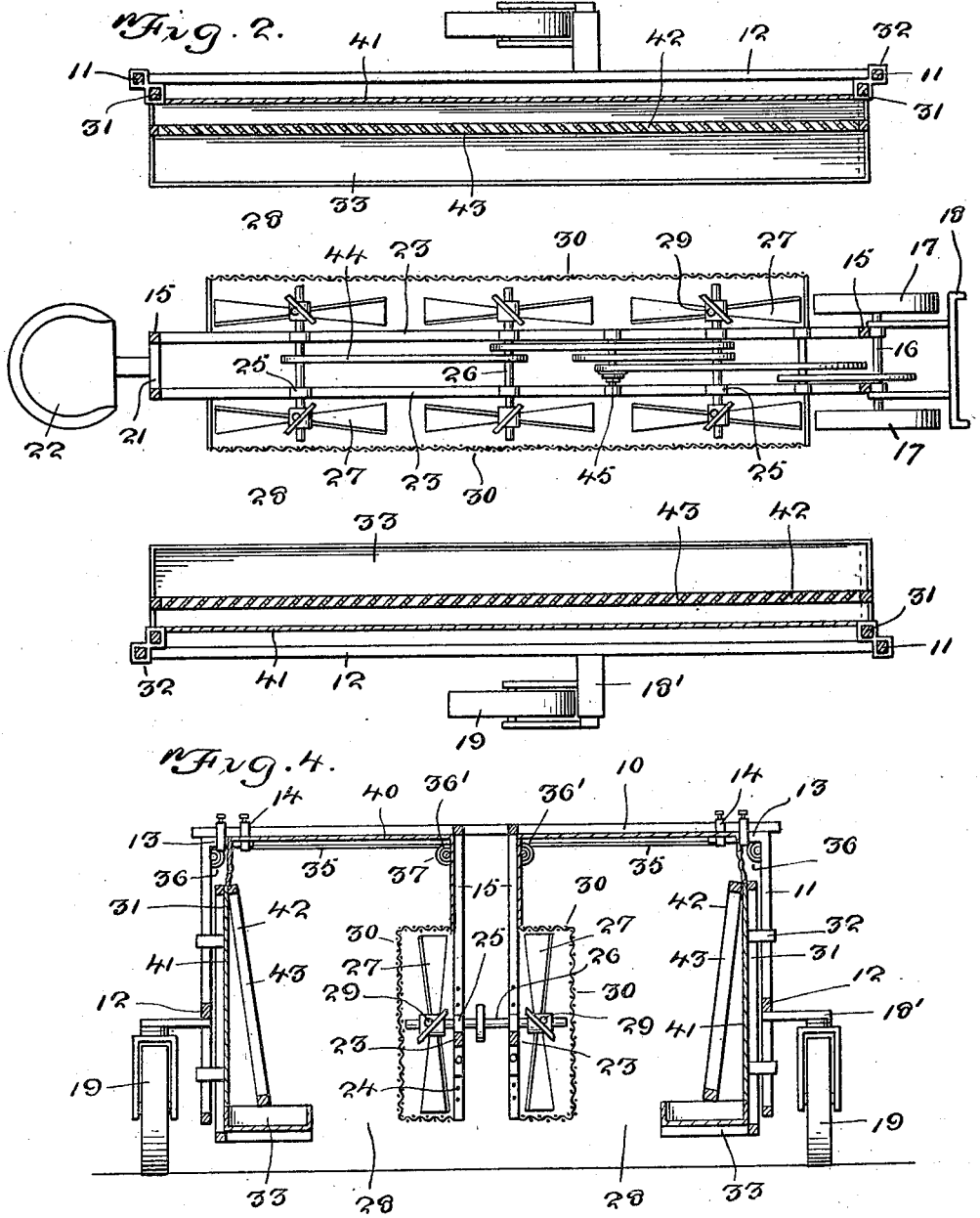

Patented June 24, 1924.

1,498,793

UNITED STATES PATENT OFFICE.

CHARLES L. HARRIS, OF LAWTON, OKLAHOMA.

INSECT DESTROYER.

Application filed May 16, 1923. Serial No. 639,317.

*To all whom it may concern:*

Be it known that I, CHARLES L. HARRIS, a citizen of the United States, residing at Lawton, in the county of Comanche and State of Oklahoma, have invented new and useful Improvements in Insect Destroyers, of which the following is a specification.

This invention relates to improvements in insect destroyers and has for an object the provision of a machine by means of which boll weevil and other insects may be dislodged from plants and collected and destroyed during the passage of the machine along the plant rows.

Another object of the invention is the provision of a machine in which the plants are subjected to a blast of air for an appreciable period, so that the dislodgement of insects from the plants will be assured before the machine passes beyond the plants, thus preventing the escape of the insects.

Another object of the invention is the provision of a machine which takes power for its operation from the traction wheels, so that the machine may be operated at a minimum expense.

Another object of the invention is the provision of a machine which in addition to the above and other advantages, is capable of adjustment to the width of the plant rows and the height of the plants.

With the above and other objects in view, the invention further includes the following novel features and details of construction, to be hereinafter more fully described, illustrated in the accompanying drawings and pointed out in the appended claims.

In the drawings:—

Figure 1 is a side elevation of an insect destroying machine constructed in accordance with the invention.

Figure 2 is a sectional view taken substantially on the line 2—2 of Figure 1.

Figure 3 is vertical longitudinal section.

Figure 4 is a section on the line 4—4 of Figure 3.

Referring to the drawings in detail wherein like characters of reference denote corresponding parts, the machine as shown comprises a frame which includes an upper section or top 10 and separate side sections 11, the latter including a horizontal member 12 which extends longitudinally of the frame. The side sections 11 further include inwardly extending projections 13 which are secured to the upper section by means of clamps 13, so that the side sections may be adjusted with respect to one another and transversely of the top section.

Extending downwardly from the upper section 10 between the side sections 11 are spaced parallel sections 15 which are rigid with the upper section 10. The sections 15 carry at their forward ends an axle 16 upon each end of which is mounted traction wheels 17. Suitable draft gear 18 may be secured to the axle to provide means for the attachment of a draft animal.

Extending downwardly from each of the side sections 11, preferably from the member 12, is an arm 18' and secured to the outer end of these arms is a caster wheel 19. A caster wheel 20 is also secured to a cross bar 21 which connects the rear ends of the spaced sections 15 of the frame, the said cross bar also serving as a supporting means for a seat 22.

Mounted for vertical adjustment in the spaced sections 15 of the machine frame are longitudinally extending bars 23, the sections 15 being provided with spaced openings 24 whereby the bars 23 may be adjusted. Mounted upon these bars are bearings 25 within which operate transversely arranged shafts 26 and mounted upon each of these shafts near the opposite ends thereof are fans 27 which are arranged to provide blasts of air in opposite directions toward the side sections 11. It is thus seen that the fans 27 rotate in substantially vertical planes, and these fans are disposed in two groups, extending longitudinally of the machine. The fans in each group, therefore act in succession, upon each plant, as the machine is drawn longitudinally of the row. The fan travels in close relation to the plant, and the air passes directly from the fan to the plant, and all chutes or tubes are dispensed with, which would tend to focus or concentrate this air. It is desired that substantially the entire area of the plant be subjected to the action of the current of air, which is not excessive at any local point. The fans are made of relatively large diameter, and are of sufficient diameter to supply the current of air to the entire area of the cotton plant of the average height. The fans 27 and the trays 33, are vertically adjustable, as set forth in the application, and they may be lowered sufficiently to be brought into close relation to the ground, whereby they may be employed for sweeping the punctured squares or the like from the ground and collecting them in the trays. The space between the fans and side sections 11 provides passages 28 which receive the plants as the machine passes down the rows, the machine being capable of treating two rows simultaneously. The fans 27 are secured upon the shafts 26 by means of adjusting nuts 29 so that they may be horizontally adjusted to regulate their proximity to the plants. The fans are enclosed upon one side and at the top and bottom within a screen housing 30.

Mounted for vertical adjustment upon the ends of the side sections 11 are supplemental frames 31, these frames carrying brackets 32 which slidingly engage the end members of the side sections 11, so that the said supplemental frames may be adjusted vertically. The supplemental frames 31 carry liquid containers 33 which are designed to receive water, or a suitable insecticide.

Secured to each end of each of the supplemental frames as shown at 34, are chains or cables 35, the latter passing over guide pulleys 36 carried by the said sections 11. The chains or cables 35 then extend inwardly below the upper section 10 and have their inner ends wound upon drums 36'. These drums are mounted upon longitudinally arranged shafts 37 which have bearings in the spaced sections 15 of the frame, the said shafts being provided with operating handles 38 and held against movement in one direction by means of ratchet mechanism 39.

The upper section 10 and the spaced sections 15 of the frame have secured thereto a canvass or cloth 40 which provides top and side walls for the passages 28, the said cloth or canvass extending downwardly along the supplemental frames 31, as shown at 41 so as to provide outer walls for the passage. Sufficient material between the upper section 10 and the supplemental frame 31 is provided to permit of vertical adjustment of these last mentioned frames.

Carried by the supplemental frames and arranged above the containers 33 are screens or baffles 42. These screens or baffles are shown as entirely formed of inclined frames whose upper and lower members are connected by spaced parallel inclined slats 43 as clearly shown in Figures 2 and 3 of the drawings. These screens or baffles 42 are arranged in the path of the air blast from the fans 27 and permit the ready passage of insects through the slats and act to prevent their passage in an opposite direction.

The axle 16 forms a drive shaft for the shafts 26 and is connected to the latter through the medium of belts or pulleys 44, as clearly shown in Figures 2 and 3 of the drawings, a clutch 45 being provided whereby power to the shafts 26 may be interrupted. This clutch may be controlled by any suitable means which preferably extends to the seat 22.

The invention is susceptible of various changes in its form, proportions and minor details of construction and the right is herein reserved to make such changes as properly fall within the scope of the appended claims.

Having described the invention what is claimed is:—

1. An insect destroyer comprising a wheel supported frame, a liquid container supported by the frame, means also supported by the frame and spaced from the container to provide an air blast and force insects toward said container, the space between the container and air blast defining a passage for plants and means located in the path of the blast to permit of the passage of insects in one direction, but retarding their passage in an opposite direction.

2. An insect destroyer comprising a wheel supported frame, a liquid container supported by the frame, means also supported by the frame and spaced from the container to provide an air blast and force insects toward said container, the space between the container and blast providing means, defining a passage for plants and a foraminous wall located within the frame upon the side of the passage remote from the blast and providing means, to permit the passage of insects in one direction but retard their passage in an opposite direction.

3. An insect destroyer comprising a wheel supported frame arranged to provide spaced relatively long passages having top and side walls, a plurality of fans arranged along one wall of each of the passages, means for operating the fans, liquid containers extending along the opposite walls of the passages, baffles carried by and spaced from the last mentioned walls and means whereby said last mentioned walls may be vertically and horizontally adjusted.

4. In a machine of the character described, a wheeled frame, a plurality of substantially vertically arranged fans mounted upon the frame in a longitudinal row, the fans discharging their air currents directly upon the plants throughout the major portion of their areas, and an open guard for the fans to prevent the plants contacting with the fans without substantially obstructing the free passage of the air from the fans.

5. In a machine of the character described, a wheeled frame, a plurality of substantially vertical fans mounted upon the frame and forming a longitudinal row of the same, said fans having relatively large diameters and adapted to supply air currents to the cotton plant throughout substantially the major portion of the entire area of the plants, the fans being arranged to travel in close relation to the plants, and a receptacle carried by the frame and arranged opposite the fans.

6. In a machine of the character described, a wheeled frame having a longitudinal passage for the reception of a row of cotton plants, a plurality of substantially vertical fans mounted upon the frame at one side of the passage and adapted to be in close relation to the row of plants whereby the air currents from the fans pass directly to the plants, said fans having relatively large diameters so that they are adapted to supply air currents to substantially the major portion of the area of the plants, the fans in the longitudinal row acting upon each plant in succession as the machine is drawn longitudinally of the row, and a receptacle carried by the frame near the opposite side of said passage.

7. In a machine of the character described, a wheeled frame having an enclosed longitudinal passage formed therein for the reception of a row of cotton plants, a plurality of substantially vertical fans arranged in a group at one side of the passage, such group extending longitudinally of the passage whereby the fans pass in close relation to the cotton plant, and act upon the same in succession, and a receptacle carried by the frame adjacent to the opposite side of the passage.

8. In a machine of the character described, a wheeled supporting frame having a longitudinal passage for the reception of a row of cotton plants, a longitudinal row of substantially vertical rotating fans disposed near one side of the passage, a receptacle arranged near the opposite side of the passage and extending throughout the major portion of the length of said row, and means whereby the fans and receptacle may be vertically adjusted upon the frame and lowered into close relation to the ground so that the fans may function to sweep the squares or the like from the ground into the receptacle.

In testimony whereof I affix my signature.

CHARLES L. HARRIS.